US009022592B2

(12) United States Patent
Tracy et al.

(10) Patent No.: US 9,022,592 B2
(45) Date of Patent: May 5, 2015

(54) COMPUTER WITH INTEGRATED LIGHT

(75) Inventors: Mark S. Tracy, Tomball, TX (US); Earl W. Moore, Cypress, TX (US); Keith A. Sauer, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 821 days.

(21) Appl. No.: 13/056,853

(22) PCT Filed: Aug. 21, 2008

(86) PCT No.: PCT/US2008/073912
§ 371 (c)(1),
(2), (4) Date: Jan. 31, 2011

(87) PCT Pub. No.: WO2010/021626
PCT Pub. Date: Feb. 25, 2010

(65) Prior Publication Data
US 2011/0128719 A1 Jun. 2, 2011

(51) Int. Cl.
F21V 8/00 (2006.01)
G06F 1/16 (2006.01)

(52) U.S. Cl.
CPC ............ G06F 1/1684 (2013.01); G06F 1/1616 (2013.01); G06F 1/1656 (2013.01)

(58) Field of Classification Search
USPC .......... 362/85, 655, 656, 652, 657, 647, 271, 362/284, 324, 428
See application file for complete search history.

(56) References Cited

U.S. PATENT DOCUMENTS

| 4,320,441 | A | * | 3/1982 | Matsushiro | .................... | 446/438 |
| 5,868,487 | A | * | 2/1999 | Polley et al. | .................... | 362/33 |
| 6,161,944 | A | | 12/2000 | Leman | | |
| 6,380,921 | B2 | | 4/2002 | Nakamura | | |
| 6,474,823 | B1 | * | 11/2002 | Agata et al. | ..................... | 362/26 |
| 6,834,975 | B2 | | 12/2004 | Tsai et al. | | |
| 7,227,535 | B1 | * | 6/2007 | Romano et al. | ............... | 345/168 |
| 7,686,466 | B2 | * | 3/2010 | Lev et al. | ......................... | 362/23 |
| 7,931,380 | B2 | * | 4/2011 | Williams et al. | ............... | 362/18 |
| 2001/0043188 | A1 | * | 11/2001 | Nakamura | .................... | 345/102 |

(Continued)

FOREIGN PATENT DOCUMENTS

GB 2470513 11/2010
JP 2001325043 11/2001

(Continued)

OTHER PUBLICATIONS

International Searching Authority, International Search Report & Written Opinion dated May 14, 2009, Appln. No. PCT/US2008/073912, p. 11.
Intellectual Property Office, Examination Report under Section 18(3), Appln No. 1102848.7, date of mailing May 2, 2012, 2 p.
Intellectual Property Office, Examination Report under Section 18(3), Appn No. 1102848.7, date of mailing Feb. 10, 2012, 4 p.
Taiwan Office Action cited in TW Appl. No. 08725517 dated Dec. 30, 2014; 6 pages.

*Primary Examiner* — Sharon Payne
(74) *Attorney, Agent, or Firm* — Trop, Pruner & Hu, P.C.

(57) ABSTRACT

A computer system is described herein. An embodiment of the computer system comprises a first portion comprising a keyboard and a second portion comprising a display. A light source is affixed to the computer, wherein the light source is maintainable in at least a first position and a second position. When the light source is in the first position, light emitted by the light source illuminates the keyboard, and when the light source is in the second position, light emitted by the light source illuminates a spatial region occupied by a user of the computer.

13 Claims, 3 Drawing Sheets

(56) References Cited

U.S. PATENT DOCUMENTS

2002/0085371 A1 7/2002 Katayama et al.
2007/0103918 A1 5/2007 Lin
2008/0002049 A1 1/2008 Saito
2008/0169408 A1 7/2008 Berman

FOREIGN PATENT DOCUMENTS

| JP | 2004-220113 | 8/2004 |
| JP | 2005-011096 | 1/2005 |
| TW | M317045 | 8/2007 |
| WO | WO-2006/100777 | 9/2006 |

* cited by examiner

COMPUTER WITH INTEGRATED LIGHT

CROSS-REFERENCE TO RELATED APPLICATION

This application is a national stage application under 35 U.S.C. §371 of PCT/US2008/073912, filed Aug. 21, 2008.

BACKGROUND

Some computers, such as laptop or notebook computers, include cameras to capture images of the users. The users need to be illuminated with relatively bright light in order for the cameras to capture an image of the user. Lights are included in some computers, but these lights are usually relatively dim and are used to illuminate the keyboard.

DETAILED DESCRIPTION

Figure 1:
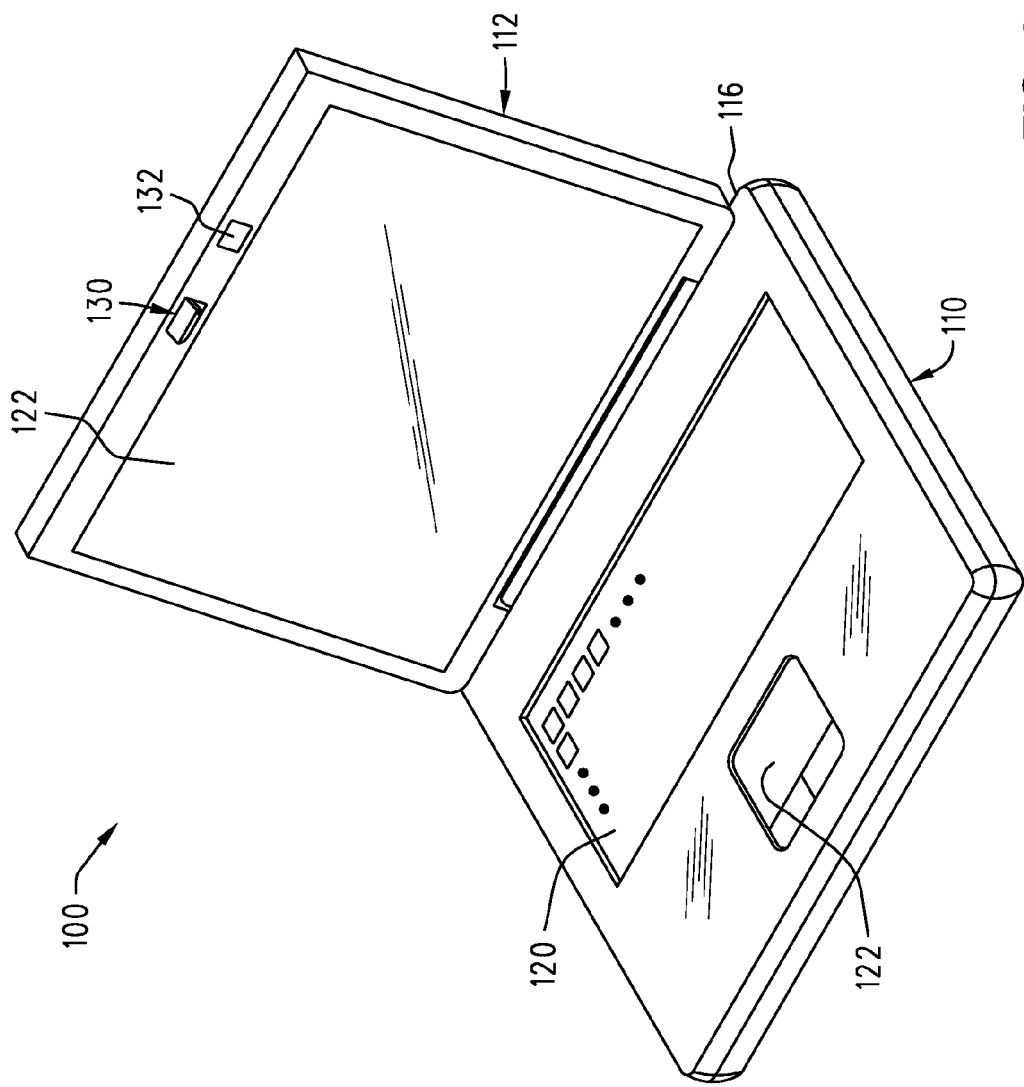
FIG. 1 is an embodiment of a computer.

An embodiment of a computer 100 is shown in FIG. 1. The computer 100 is a laptop type computer, however, the description provided herein is applicable to other types of computers. The computer 100 has a first portion 110 and a second portion 112, wherein the first portion 110 is attached to the second portion 112. In the embodiment of FIG. 1, the first portion 110 is pivotally attached to the second portion 112 by way of a hinge 116. The first portion 110 comprises a keyboard 120 and a pointer pad 122, which serves to detect movement of a finger or other object in order to move a displayed cursor.

The second portion 112 has a display 122, such as a liquid crystal display (LCD) located therein. In the embodiment of FIG. 1, the second portion 112 also includes a light source 130 and a camera 132. The camera 132 shown in FIG. 1 is the lens portion; other components of the camera may be located in either the first portion 110 or the second portion 112. The camera 132 may be focused to capture images of the user of the computer 100. Such a user may occupy a region of space in front of the display 122 and above the keyboard 120. Accordingly, the camera 132 may be designed to capture images from a region in front of the computer 100. As described in greater detail below, the light source 130 may illuminate this region of space.

The light source 130 is movable between at least two positions as described in greater detail below. When the light source 130 is in a first position, light emitted by the light source 130 illuminates the keyboard 120. The illumination serves to enable a user of the computer 100 to use and/or see the keyboard in low ambient light conditions. When the light source 130 is in the second position, it illuminates a spatial region occupied by the user of the computer 100 as described above. In this second position, the light source 130 illuminates the user in order for the camera 132 to capture a better image of the user. Because a high intensity of light may be required to capture an image of the user, the intensity of light emitted by the light source 130 may be greater when the light source 130 is in the second position.

Having summarily described the operation of the computer 100 with the light source 130, it will now be described in greater detail. In some embodiments, the light source 130 and/or the second portion 112 has a mechanism that serves to maintain the light source 130 in fixed positions relative to the second portion 112, wherein the fixed positions include the above-described first and second positions. In some embodiments, a detent and/or a ratchet mechanism is used to maintain the light source 130 in the above-described positions.

Figure 2:
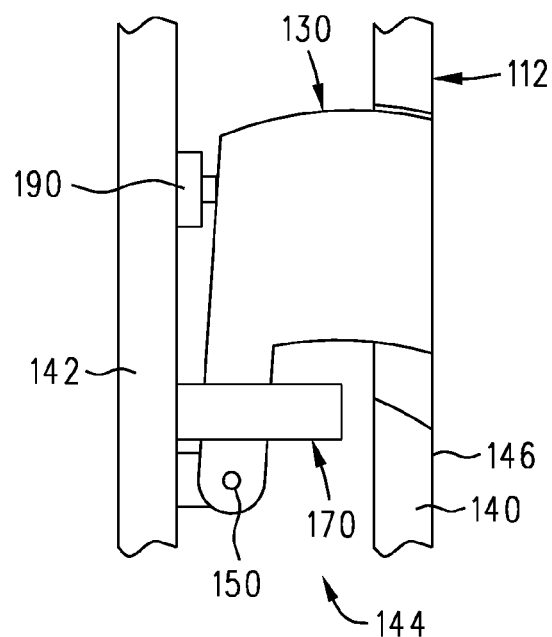
FIG. 2 is a partial cutaway view of the second portion of the computer of FIG. 1 with the light source retracted within the computer.

An embodiment of light source 130 located within the second portion 112 is shown in FIG. 2, which is a cutaway view of the second portion 112. The embodiment of the second portion 112 of FIG. 2 has an exterior wall 140, an interior wall 142, and a space 144 located therebetween. The exterior wall 140 has an exterior surface 146. A hole 148 is located in the exterior wall 140 so as to accommodate the light source 130. The light source 130 is connected to the interior wall 142 at a pivot point 150, which enables the light source 130 to pivot relative to the interior wall 142. The embodiment of FIG. 2 includes a mechanism 170 that serves to maintain the light source 130 in preselected fixed positions. As shown in FIG. 2, the light source 130 is substantially located within the space 144 of the second portion 112. With additional reference to FIG. 1, this position of the light source 130 may be referred to as the second position and may be used to illuminate the user of the computer 100 as described above.

Figure 3:
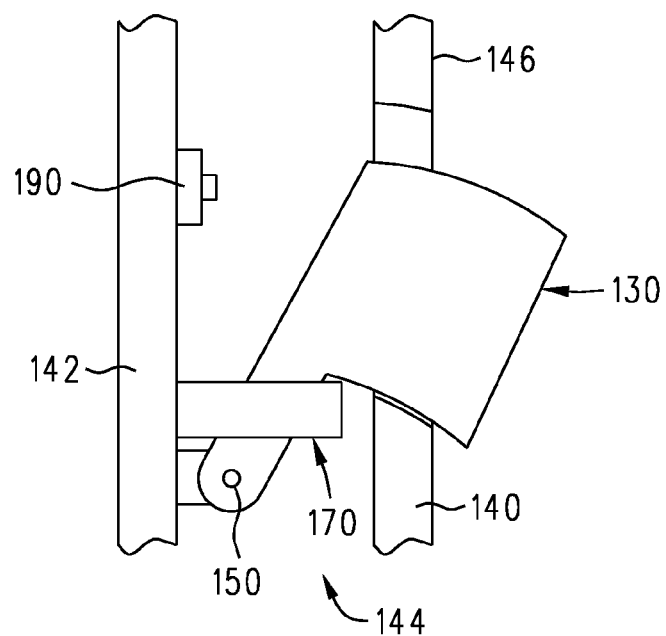
FIG. 3 is a partial cutaway view of the second portion with the light source extended from the computer.

FIG. 3 shows the light source 130 in a position wherein it extends from the exterior wall 140. With additional reference to FIG. 1, this position of the light source 130 may serve to illuminate the keyboard 120 and is sometimes referred to as the first position. The mechanism 170 may maintain the light source 130 in the fixed position of FIG. 3. In other embodiments, the mechanism 170 forces the light source against the exterior wall 140, which maintains the light source 130 in the first position.

The mechanism 170 may be any of a plurality of mechanisms that serve to maintain the light source 130 in different positions. In some embodiments, the mechanism 130 is a push-push mechanism, which causes the light source 130 to move from one position to the other position when pressure is applied to the light source 130. When the light source 130 is retracted or in the second position as shown in FIG. 2, it may be pushed toward the interior wall 142 and then released. The push-push mechanism will cause the light source 130 to move to the extended or first position of FIG. 3. Likewise, when the light source 130 is in the extended position of FIG. 3, it may be pushed toward the interior wall 142, which will cause it to remain in the retracted position of FIG. 2 until pressure is reapplied.

Figure 4:
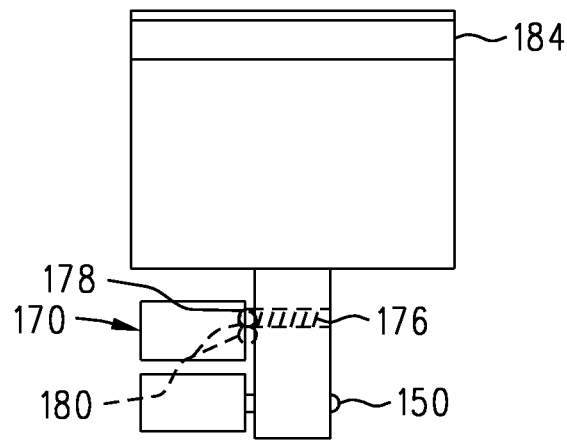
FIG. 4 is a top view showing the relation between an embodiment of the mechanism and the light source of FIG. 1
Figure 5:
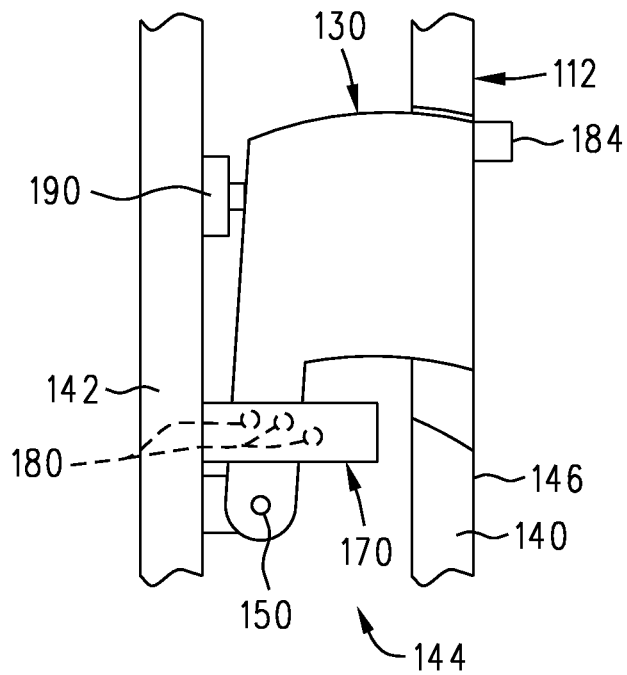
FIG. 5 is a side view of the mechanism and light source of FIG. 4.

FIGS. 4 and 5 shows an embodiment of the light source 130 and the mechanism 170, wherein the combination uses a detent mechanism to maintain the light source 130 in fixed positions. In these embodiments, the light source 130 has a hole 174 located therein. A spring 176 forces a ball 178 or the like from the hole 174. The mechanism 170 has a plurality of detents 180 or holes located therein that are designed to receive the ball 178. As the light source 130 is moved, the ball 178 enters one of the holes 180, which causes the light source 130 to remain in a fixed location. The application of pressure on the light source 130 moves the light source 130 until a next detent is encountered. In order to move the light source 130, a tab 184 is provided. The tab 184 enables a user to grab the light source 130 in order to pull it from the second portion 112, FIG. 1. It is noted that the mechanism 170 of FIGS. 4 and 5 has three detents 180, which allows the light source 130 to be in three fixed positions. These positions provide better adjustment of the light source 130 for different positions of the second portion 112 relative to the first portion 110 and relative to the user. It is noted that other embodiments may have more or fewer detents.

In a similar embodiment, the mechanism 170 may provide friction against the light source 130. The friction serves to maintain the light source 130 in fixed positions. In such an embodiment, the tab 184 may also enable the user to grab the light source 130 to pull it from the second portion 112, FIG. 1, of the computer 100.

Referring to FIG. 2, an embodiment of the computer 100 may include one or more switches or position sensors to determine the location of the light source 130. The embodiment of FIG. 2 has a switch 190 that is located on the interior wall 142. When the light source 130 is retracted, or in the second position, the switch 190 is toggled, which indicates to the computer 100 that the light source 130 is retracted. In this configuration, the light source 130 may be aimed to illuminate a user. Thus intense light may be required from the light source 130. Numerous other position sensors may be used to determine the position of the light source 130.

The light source 130 has been described above as being in the second portion 112. However, in some embodiments, the light source may be located in the first portion 110. In such embodiments, the light source 130 may extend above the first portion 110 in order to illuminate the keyboard 120.

What is claimed is:

1. A computer comprising:
   a first portion comprising a keyboard;
   a second portion comprising a display and an exterior wall; and
   a light source pivotally mounted inside the second portion within the exterior wall, wherein said light source is pivotally adjustable between at least a first position and a second position, wherein when said light source is in said first position, light emitted by said light source illuminates said keyboard, and wherein when said light source is in said second position, light emitted by said light source illuminates a spatial region occupied by a user of said computer,
   wherein when said light source is in said second position, said light source does not protrude from the exterior wall of the second portion, and when said light source is in said first position, said light source protrudes through an opening of the exterior wall.

2. The computer of claim 1, wherein said light source is further pivotally adjustable to a third position.

3. The computer of claim 1, wherein said light source is pivotally adjustable between said first position and said second position by way of a push-push mechanism.

4. The computer of claim 1, wherein said light source is maintainable in said first position and said second position by way of friction.

5. The computer of claim 1, further comprising a camera attached in said second portion, wherein said camera is focused to capture an image in a region of space, and where said region of space is illuminatable by said light source.

6. The computer of claim 5, wherein said region of space is illuminatable by said light source when said light source is in said second position.

7. The computer of claim 1, wherein the second portion further comprises an interior wall, and wherein said light source is in a chamber between the interior and exterior walls, and wherein said light source is pivotally mounted in the chamber.

8. The computer of claim 7, further comprising a mechanism in the chamber, the mechanism to maintain said light source at each respective one of said first and second positions.

9. The computer of claim 8, wherein the mechanism is a detent mechanism including a plurality of detents corresponding to at least said first and second positions.

10. The computer of claim 9, wherein said light source has at least one member that is receivable into said detents.

11. The computer of claim 1, wherein said first portion is pivotally attached to said second portion.

12. A method comprising:
    providing a first portion of a computer, the first portion including a keyboard;
    pivotally attaching the first portion to a second portion of the computer, the second portion including a display and an exterior wall with an opening;
    pivotally mounting a light source inside the second portion within the exterior wall, the light source pivotable between at least a first position and a second position, wherein when the light source is in the first position, light emitted by the light source illuminates the keyboard, and wherein when the light source is in the second position, light emitted by the light source illuminates a region in front of the computer occupied by a user of the computer, wherein when the light source is in the second position, the light source does not protrude from the exterior wall of the second portion, and wherein when the light source is in the first position, the light source protrudes through the opening of the exterior wall.

13. The method of claim 12, wherein pivotally mounting the light source inside the second portion comprises pivotally mounting the light source within a chamber between the exterior wall and an interior wall of the second portion.

\* \* \* \* \*

UNITED STATES PATENT AND TRADEMARK OFFICE
CERTIFICATE OF CORRECTION

PATENT NO.       : 9,022,592 B2
APPLICATION NO.  : 13/056853
DATED            : May 5, 2015
INVENTOR(S)      : Mark S. Tracy et al.

Page 1 of 1

It is certified that error appears in the above-identified patent and that said Letters Patent is hereby corrected as shown below:

Title page, item (74), Attorney, in column 2, line 1, after "Trop, Pruner & Hu, P.C." insert
-- Hewlett-Packard Patent Department --, therefor.

Signed and Sealed this
Seventeenth Day of November, 2015

Michelle K. Lee
*Director of the United States Patent and Trademark Office*